US012688501B2

(12) United States Patent   (10) Patent No.: US 12,688,501 B2
Grover et al.   (45) Date of Patent: Jul. 21, 2026

(54) CIRCULAR BLOCKCHAINS

(71) Applicant: MICRO FOCUS LLC, Santa Clara, CA (US)

(72) Inventors: Douglas Max Grover, Rigby, ID (US); Michael F. Angelo, Houston, TX (US)

(73) Assignee: Micro Focus LLC, Santa Clara, CA (US)

( * ) Notice: Subject to any disclaimer, the term of this patent is extended or adjusted under 35 U.S.C. 154(b) by 91 days.

(21) Appl. No.: 18/069,962

(22) Filed: Dec. 21, 2022

(65) Prior Publication Data

US 2024/0211936 A1   Jun. 27, 2024

(51) Int. Cl.
G06Q 20/38 (2012.01)

(52) U.S. Cl.
CPC ..... G06Q 20/3825 (2013.01); G06Q 20/3827 (2013.01)

(58) Field of Classification Search
CPC ...................... G06Q 20/3825; G06Q 20/3827
See application file for complete search history.

(56) References Cited

U.S. PATENT DOCUMENTS

| | | | |
|---|---|---|---|
| 2018/0225660 A1* | 8/2018 | Chapman | G06Q 20/10 |
| 2020/0201560 A1* | 6/2020 | Yang | G06F 3/0655 |
| 2020/0265516 A1* | 8/2020 | Xu | H04L 9/50 |
| 2020/0266989 A1* | 8/2020 | Krcmaricic-Barackov | H04L 9/30 |
| 2023/0281618 A1* | 9/2023 | Cella | G06Q 20/401 705/44 |

FOREIGN PATENT DOCUMENTS

| | | | |
|---|---|---|---|
| CN | 110036389 A | * 7/2019 | G06F 16/951 |
| CN | 108510268 B | 5/2021 | |

OTHER PUBLICATIONS

Annular Blockchain Structure, Data Processing Method and Device (Year: 2018).*
Navigation Through Data Manipulation to Fast Track the Block Chain Method and System (Year: 2017).*
A Method for Realizing Mixed Chain of Union Chain and Polkadot Chain (Year: 2020).*
Block Chain Mining Using Trusted Nodes (Year: 2017).*
Cross-chain Transaction Method, Device, Device and Storage Medium (Year: 2022).*
Transfer of Encrypted Money From a Remote Limited Access Wallet (Year: 2021).*
A Method of Multi-source Heterogeneous Data Asset Dependency Transaction Chain Sharing (Year: 2022).*
Method and System for Identifying and Tracking IoT Device Based on Multi-dimensional Block Chain (Year: 2018).*

(Continued)

*Primary Examiner* — Patrick Mcatee
(74) *Attorney, Agent, or Firm* — Sheridan Ross P.C.

(57) ABSTRACT

A plurality of circular blockchains are created. The plurality of circular blockchains may comprise different structures. For example, the plurality of circular blockchains may include: a single genesis block where a last block in each of the plurality of circular blockchain links back to the single genesis block, a plurality of genesis blocks where a last block in each of the plurality of circular blockchain links back to individual ones of the plurality of genesis blocks, and a genesis block and one or more connection blocks that form the plurality of circular blockchains.

20 Claims, 8 Drawing Sheets

(56) References Cited

OTHER PUBLICATIONS

Method of Generating Globally Verifiable Unique Identifiers Using a Scalable Interlinked Blockchain Structure (Year: 2019).*
Know Your Customer (KYC) and Anti-Money Laundering (AML) Verification in a Multi-Decentralized Private Blockchains Network (Year: 2020).*
System and Method for Creating Multi Dimension Blockchain (Year: 2021).*

* cited by examiner

CIRCULAR BLOCKCHAINS

FIELD

The disclosure relates generally to blockchains and particularly to improving the efficiency of blockchains.

BACKGROUND

Blockchain technology is becoming pervasive in the industry and is being used in many environments. Over time, the blockchains may become incredibly long. For example, blockchains are being used to track, currency exchanges, security information, IoT devices, database transactions, etc. Over time, these types of blockchains can have millions or even billions of blocks stored on a number of nodes. Verification of long blockchains in a distributed ledger can be become very processor intensive and thus impractical in terms of communications as well as validation. Blockchain size and performance issues are clearly a major problem with blockchains.

SUMMARY

These and other needs are addressed by the various embodiments and configurations of the present disclosure. The present disclosure can provide a number of advantages depending on the particular configuration. These and other advantages will be apparent from the disclosure contained herein.

A plurality of circular blockchains are created. The plurality of circular blockchains may comprise different structures. For example, the plurality of circular blockchains may include: a single genesis block where a last block in each of the plurality of circular blockchain links back to the single genesis block, a plurality of genesis blocks where a last block in each of the plurality of circular blockchain links back to individual ones of the plurality of genesis blocks, and a genesis block and one or more connection blocks that form the plurality of circular blockchains.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112. Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "blockchain" as described herein and in the claims refers to a growing list of records, called blocks, which are linked using cryptography. The blockchain is commonly a decentralized, distributed and public digital ledger that is used to record transactions across many computers so that the record cannot be altered retroactively without the alteration of all subsequent blocks and the consensus of the network. Each block contains a cryptographic hash of the previous block, a timestamp, and transaction data (generally represented as a merkle tree root hash). For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. In verifying or validating a block in the blockchain, a hashcash algorithm generally requires the following parameters: a service string, a nonce, and a counter. The service string can be encoded in the block header data structure, and include a version field, the hash of the previous block, the root hash of the merkle tree of all transactions (or information or data) in the block, the current time, and the difficulty level. The nonce can be stored in an extraNonce field, which is stored as the left most leaf node in the merkle tree. The counter parameter is often small at 32-bits so each time it wraps the extraNonce field must be incremented (or otherwise changed) to avoid repeating work. When validating or verifying a block, the hashcash algorithm repeatedly hashes the block header while incrementing the counter & extraNonce fields. Incrementing the extraNonce field entails recomputing the merkle tree, as the transaction or other information is the left most leaf node. The body of the block contains the transactions or other information. These are hashed only indirectly through the Merkle root.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
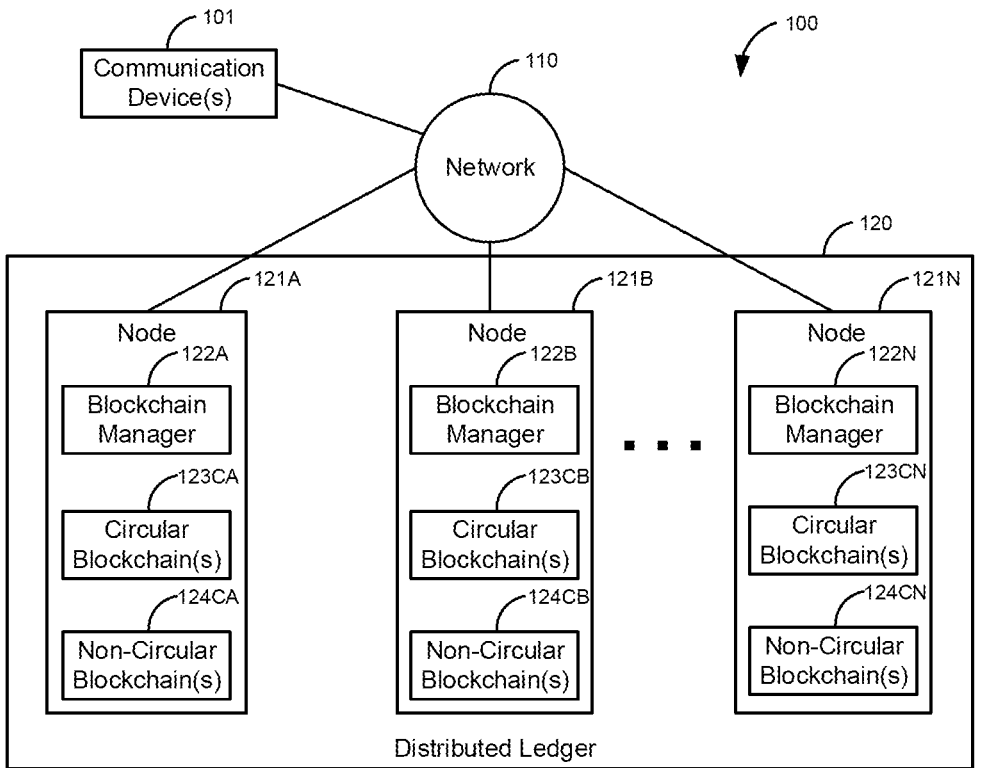
FIG. 1 is a block diagram of a first illustrative system of a distributed ledger for storing circular blockchains.

FIG. 1 is a block diagram of a first illustrative system 100 of a distributed ledger 120 for storing circular blockchains 123. The first illustrative system 100 comprises communication device(s) 101, a network 110, and the distributed ledger 120.

The communication device(s) 101 can be or may include any device that can communicate with the distributed ledger 120 via the network 110, such as a Personal Computer (PC), a cellular telephone, a Personal Digital Assistant (PDA), a tablet device, a notebook device, a laptop computer, a smartphone, and/or the like. As shown in FIG. 1, any number of communication device(s) 101 may be connected to the network 110, including only a single communication device 101.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Transmission Communication Protocol (TCP), User Datagram Protocol (UDP), Hyper Text Transfer Protocol (HTTP), Web Real-Time Protocol (Web RTC), and/or the like. Thus, the network 110 is an electronic communication network configured to carry messages via packets and/or circuit switched communications.

The distributed ledger 120 is a system for storing copies of blockchains 123CA-123CN/124CA-124CN. The distributed ledger 120 comprises nodes 121A-121N. The nodes 121A-121N may be any device/computer construct that can be used to store information in the blockchains 123CA-123CN/124CA-124CN. For example, a node 121 may be a server, a computer, a container, a virtual machine, a database server, and/or the like. The nodes 121A-121N comprise blockchain managers 122A-122N, circular blockchains 123CA-123CN, and non-circular blockchains 124CA-124CN.

The circular blockchains 123CA-123CN are copies of the same blockchain 123. Having copies along with hashing processes makes the circular blockchains 123CA-123CN highly immutable. The designation of "C" in numbering of the circular blockchains 123CA-123CN indicates that it is a copy. As described herein, a circular blockchain 123 is a blockchain that links back on itself or will in the future link back on itself.

The non-circular blockchains 124CA-124CN are blockchains that do not link back on themselves. The designation of "C" in numbering of the non-circular blockchains 124CA-124CN indicates that it is also a copy. When discussing any of the blockchains 123/124, it can be assumed that the blockchains 123/124 may be replicated and copied in the distributed ledger 120.

Figure 2:
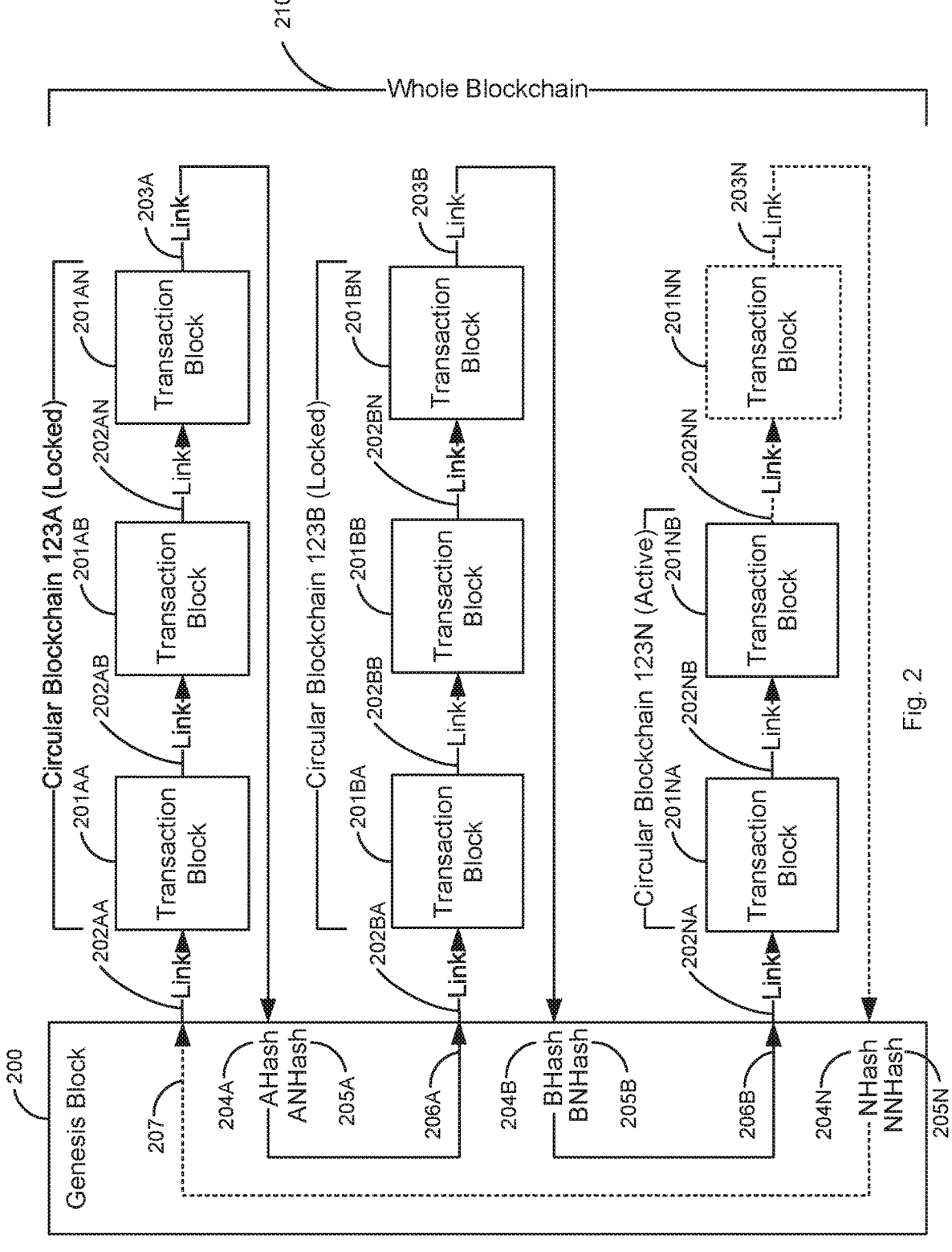
FIG. 2 is a block diagram of a plurality of circular blockchains that use a single genesis block.

FIG. 2 is a block diagram of a plurality of circular blockchains 123A-123N that use a single genesis block 200. FIG. 2 comprises a single genesis block 200, and a plurality of circular blockchains 123A-123N. The circular blockchains 123A and 123B are locked circular blockchains 123A and 123B. The circular blockchain 123N is an active circular blockchain 123N. The single genesis block 200 and the circular blockchains 123A-123N comprise the whole blockchain 210.

The single genesis block 200 is the first block that is created. The single genesis block 200 is the single genesis block 200 for all of the circular blockchains 123A-123N.

The circular blockchain 123A comprises the single genesis block 200 and transaction blocks 201AA-201AN. A transaction block 201 is a block that is added to the circular blockchain 123 based on an event, such as, a cryptocurrency transaction, a user authentication, an event on a device, a signing of a contract, an addition of a component to a software application, and/or the like. The transaction blocks 201AA-201AN are linked together using forward links 202AA-202AN. The forward links 202AA-202AN point to hashes (not shown) of the previous block as is traditionally done in blockchains. The transaction block 201AN has a forward link 203A that links back to the single genesis block 200, which results in locking the circular blockchain 123A.

The circular blockchain 123B comprises the single genesis block 200 and transaction blocks 201BA-201BN. The transaction blocks 201BA-201BN are linked together using forward links 202BA-202BN. The forward links 202BA-202BN point to hashes (not shown) of the previous block as is traditionally done in blockchains. The transaction block 201BN has a forward link 203B that links back to the single genesis block 200, which results in locking the circular blockchain 123B.

The circular blockchain 123N comprises the single genesis block 200 and transaction blocks 201NA-201NB. The transaction blocks 201NA-201NB are linked together using forward links 202NA-202NB. The forward links 202NA-202NB point to hashes (not shown) of the previous block as is traditionally done in blockchains. Circular blockchain 123N is an example of an active circular blockchain 123N. As the transaction block 201NN/forward link 202NN are added to the circular blockchain 123N, the forward link 203N is then used to lock the circular blockchain 123N.

When an active circular blockchain 123 is locked, the forward link 203 may point to a hash that is stored in the single genesis block 200. For example, in FIG. 2, the forward link 203A points to AHash 204A and ANHash 205A. The AHash 204A is a hash of the circular blockchain 123A. The AHash 204A may or may not include the single genesis block 200. The ANHash 205A is a hash of the transaction block 201AN. The single genesis block 200 has a genesis block link 206A that points to the forward link 202BA. Likewise, the forward link 203B may point to a hash that is stored in the single genesis block 200. For example, in FIG. 2, the forward link 203B points to BHash 204B and the BNHash 205B. The BHash 204A is a hash of the circular blockchain 123B. The BHash 204A may or may not include the single genesis block 200. The BNHash 205B is a hash of the transaction block 201BN. The single genesis block 200 has a genesis block link 206B that points to the forward link 202NA. The forward link 203N may point to a hash that is stored in the single genesis block 200. For example, in FIG. 2, the forward link 203N points to NHash 204N and the NNHash 205N. The NHash 204N is a hash of the circular blockchain 123N. The NHash 204N may or may not include the single genesis block 200. The NNHash 205N is a hash of the transaction block 201NN. The single genesis block 200 has a genesis block locking link 207 that points to the forward link 202AA. The genesis block locking link 207 locks the whole blockchain 210.

In one embodiment, the hashes 204/205 may be a summing hash of the previous circular blockchain(s) 123. For example, in FIG. 2, the AHash 204A would be a hash of the circular blockchain 123A and the BHash 204B would be a hash of both circular blockchains 123A and 123B.

As can be seen in FIG. 1, when the whole blockchain 210 is locked there is a circular trail of links 202AA-202AN, 203A, 206A, 202BA-202BN, 203B, 206B, 202NA-202NN, 203N, and 207 that traverses each block in the whole blockchain 210 via the single genesis block 200. The circular trail of links 202AA-202AN, 203A, 206A, 202BA-202BN, 203B, 206B, 202NA-202NN, 203N, and 207 can be used to traverse the whole blockchain 210.

In addition, to storing the hash values 204/205 in the single genesis block 200, additional information may be stored in the single genesis block 200 that is associated with a locked circular blockchain 123/whole blockchain 210. For example, date/time information when a circular blockchain 123 was locked, information of specific transaction blocks 201 in the locked circular blockchain 123, types of transaction blocks 201 in the locked circular blockchain 123, an index of the locked circular blockchain 123, number/types of transaction blocks 201 in the whole blockchain, and/or the like can be stored in the single genesis block 200. This allows a search process to identify specific transaction blocks 201 very quickly in the whole blockchain 210 versus having to search the whole blockchain 210 sequentially. For example, if a search process is looking for a specific type of transaction block 201 in the whole blockchain 210, the index may be used to quickly identify which locked circular blockchains 123 have that specific type of transaction block 201.

Figure 3:
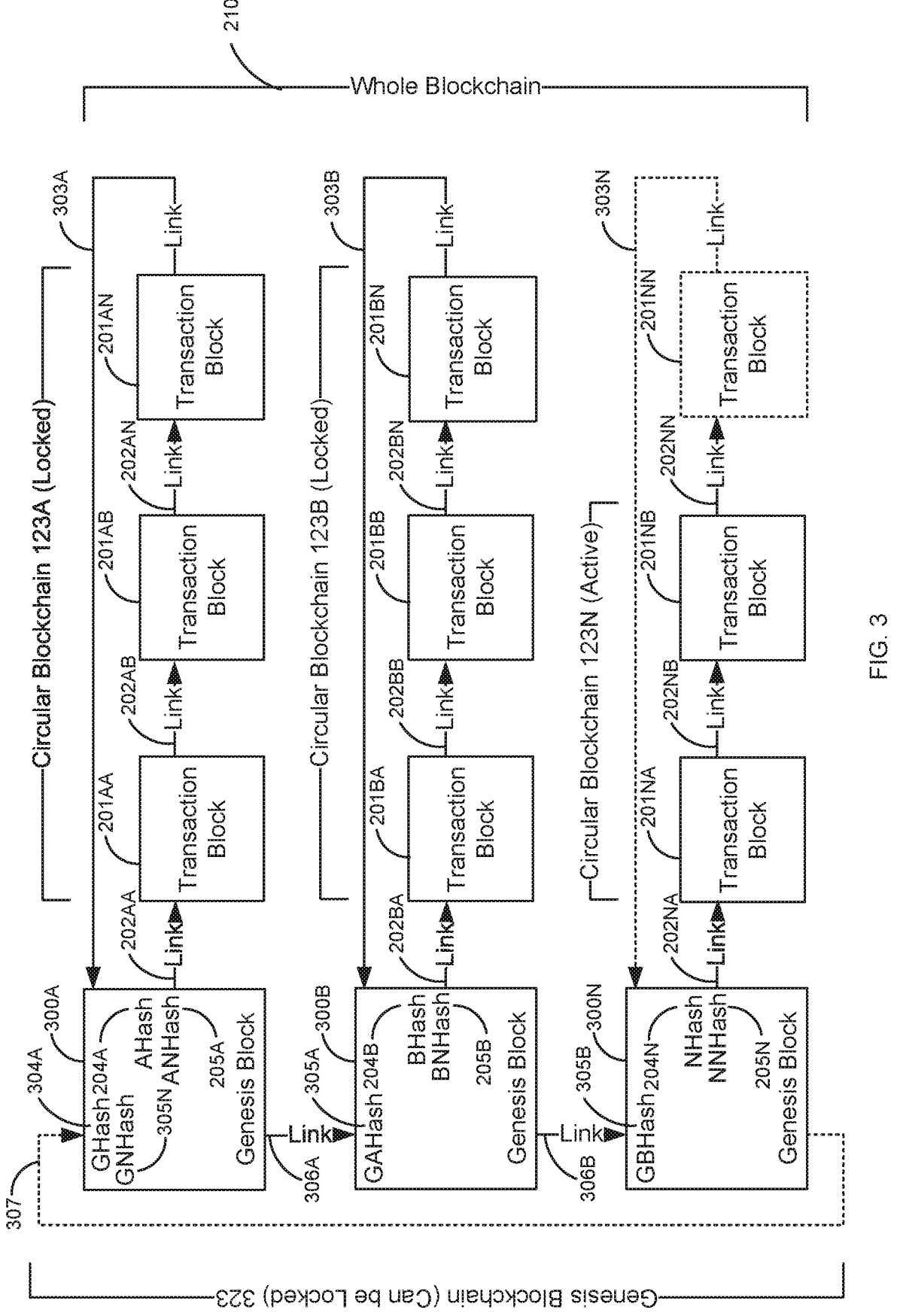
FIG. 3 is a block diagram of a plurality of circular blockchains that use genesis blocks that form a genesis blockchain.

FIG. 3 is a block diagram of a plurality of circular blockchains 123A-123N that use genesis blocks 300A-300N that form a genesis blockchain 323. In FIG. 3, the circular blockchains 123A-123N, the transaction blocks 201AA-201AN, 201BA-201BN, and 201NA-201NN, the forward links 202AA-202AN, 202BA-202BN, and 202NA-202NN, and 203A-203N are similar to those discussed in FIG. 2. Likewise, the hashes 204A-204N/205A-205N are similar.

The difference between FIG. 2 and FIG. 3 is that each circular blockchain 123A-123N have a corresponding genesis block 300A-300N. In FIG. 3 the forward links 303A-303N link back to a respective genesis block 300 associated with the respective circular blockchain 123. Instead of the hashes 204/205 all being in the single genesis block 200, in FIG. 3, each genesis block 300A-300N has the respective hashes 204/205 associated with the respective circular blockchain 123.

In this FIG. 3, the genesis blocks 300A-300N form a genesis blockchain 323 that can also be locked. The genesis blocks 300A-300N are linked together by the genesis links 306A-306B. The genesis link 306A points to the GAHash 305A. The GAHash 305A is a hash of the genesis block 300A. The genesis link 306B points to the GBHash 305B. The GBHash 305B is a hash of the genesis block 300B. The genesis blockchain 323 can then be locked by the genesis blockchain locking link 307. The genesis blockchain locking link 307 links the whole blockchain 210. The whole blockchain 210 is locked after the circular blockchain 123N has been locked.

The circular blockchains 123A-123N may be for a similar process or for different processes. For example, there may be three circular blockchains 123 for three different processes in a branch location of a corporation. Thus, there would be a genesis blockchain 323 of three genesis blocks 300A-300N that can be locked (linked back to the first genesis block 300 via genesis blockchain locking link 307) when the three circular blockchains 123 are locked. For example, the circular blockchains 123A-123N may be locked based on a time period and then archived.

Like discussed for the single genesis block 200 of FIG. 2, each of the genesis blocks 300A-300N may have additional information (e.g., date/time information when a blockchain 123 was locked, information of specific blocks 201 in the locked blockchain 123, types of blocks in the locked blockchain 123, an index of the locked blockchain 123, etc.) to make for more efficient searching of each locked circular blockchain 123A-123N.

Figure 4:
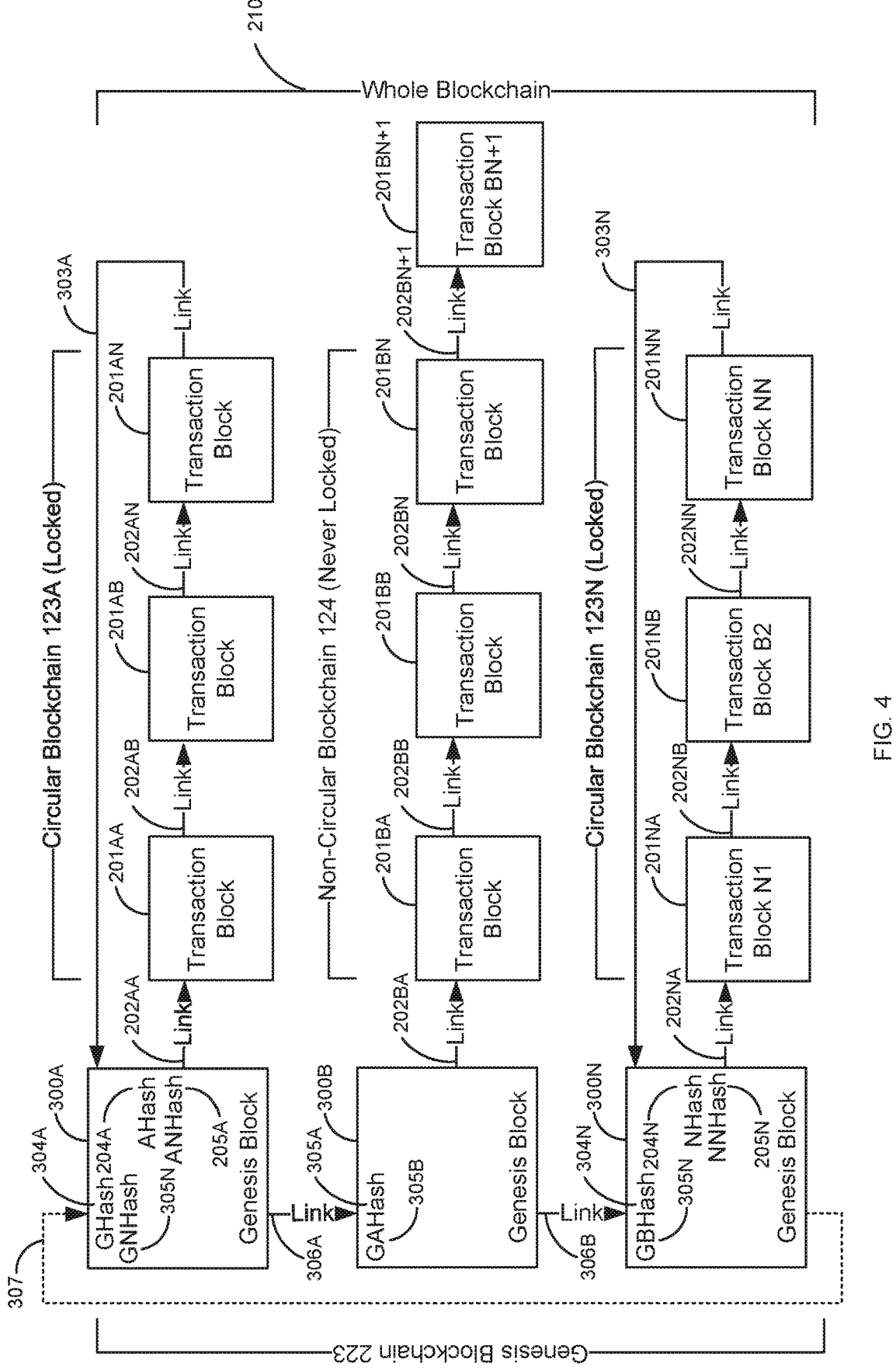
FIG. 4 is a block diagram of a plurality of blockchains that have genesis blocks that are part of a genesis blockchain where the plurality of blockchains comprise lockable circular blockchains and non-circular blockchains.

FIG. 4 is a block diagram of a plurality of circular blockchains 123A/123N that use genesis blocks 300 that are part of a genesis blockchain 323 where the plurality of circular blockchains 123A/123N comprise lockable circular blockchains 123A/123N and a non-circular blockchains 124.

The difference between FIG. 4 and FIG. 3 is that instead of having the circular blockchain 123B, in FIG. 4, the circular blockchain 123B is replaced by a non-circular blockchain 124. In FIG. 4, the non-circular blockchain 124 is not lockable while the circular blockchains 123A/123N are locked (where the forward pointer 303A/303N point back to their respective genesis blocks 300A/300N. In FIG. 4, the non-circular blockchain 124 has transaction block 201BN+1 and forward link 202BN+1.

In one embodiment, none of the blockchains 123A/123N are circular blockchain 123. In this embodiment, the non-circular blockchains 124 may still use the genesis blockchain 323. This embodiment may be useful where the different non-circular blockchains 124 are related to each other and the genesis blockchain 323 is used to group the different non-circular blockchains 124 to each other.

The locking process for locking the circular blockchains 123 may also include a digital signature. For example, the digital signature may be created and stored in the genesis block 200/300 when the circular blockchain 123 is locked using the forward links 203/303. Likewise, a digital signature may also be used to lock the genesis block 200/genesis blockchain 323. For example, the digital signature may be created and stored when the genesis block locking link 207 and/or the genesis blockchain locking link 307 is created. The digital signature may indicate who locked the circular blockchain 123, a time/date of the locking, and/or the like.

Figure 5:
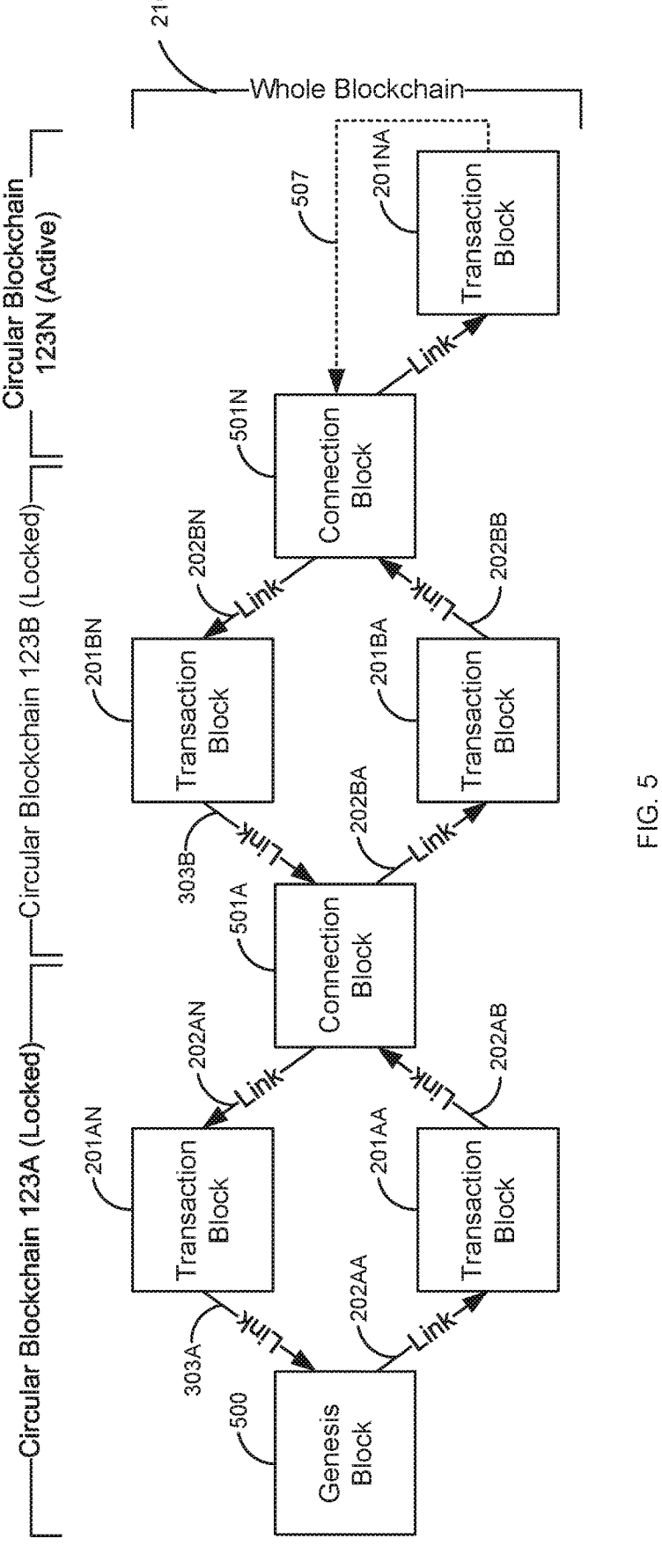
FIG. 5 is a block diagram of a plurality of circular blockchains that use connection blocks to form the plurality of circular blockchains.

FIG. 5 is a block diagram of a plurality of circular blockchains 123A-123N that use connection blocks 501A-501N to form the plurality of circular blockchains 123A-123N. In this embodiment, the blockchain 123A comprises a genesis block 500, transaction blocks 201AA/201AN, and connection block 501A. The blockchain 123B comprises the connection blocks 501A/501N and transaction blocks 201BA/201BN. The circular blockchain 123N comprises the connection block 501N and the transaction block 201NA.

After the blockchain 123A is half completed, a connection block 501A is added to the circular blockchain 123A as shown in FIG. 5. Although FIG. 5 uses a half completed blockchain 123 for creating the connection block 501, any type of event/process may be used to create the connection block 501. Thus, in some embodiments, the number of transaction blocks 201 on each side of the connection block 501A for a particular circular locked blockchain 123 may comprise a different number of transactions blocks 201. For example, transaction block 201AA may comprise forty transaction blocks 201 and transaction block 201AN may comprise seventeen transaction blocks 201 when the circular blockchain 123A is locked. In one embodiment, the connection block 501 may also be a transaction block 201 for its respective circular blockchain 123.

When the next active circular blockchain 123B is started, the connection block 501A is used as the genesis block 500 for the next active circular blockchain 123B. The process repeats in like manner until the active circular blockchain 123B is locked and the next active circular blockchain 123N is created where connection block 501N links to the transaction block 201NA.

If the last active circular blockchain 123 is to be locked where there can be no more additions (e.g., circular blockchain 123N), the blockchain 123 will not have a connection block 501. Thus, when the last transaction block (e.g., transaction block 201NA) links back using blockchain locking link 507, the whole blockchain 210 is locked because the last circular blockchain 123 does not have a connection block 501 for a next circular blockchain 123. The locking process of FIG. 5 may also use a hash/digital signature.

All of the above embodiments described herein may use a reverse hash/second hash as a way to prevent against hash collisions. For example, the hashes 204/205/304/305 may also comprise a second hash generated by a second hashing algorithm.

Figure 6:
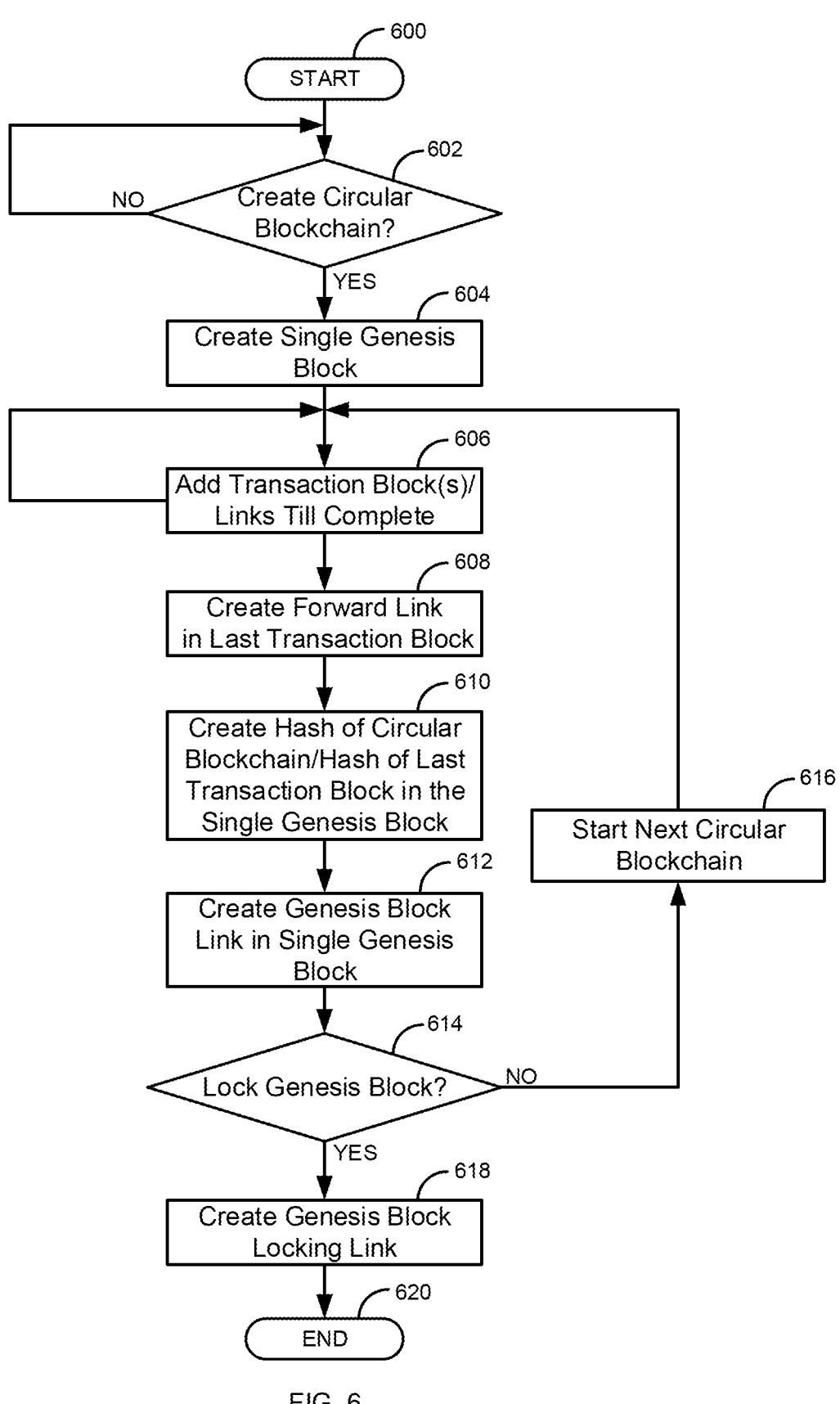
FIG. 6 is a flow diagram of a process for creating a plurality of circular blockchains that use a single genesis block.
Figure 7:
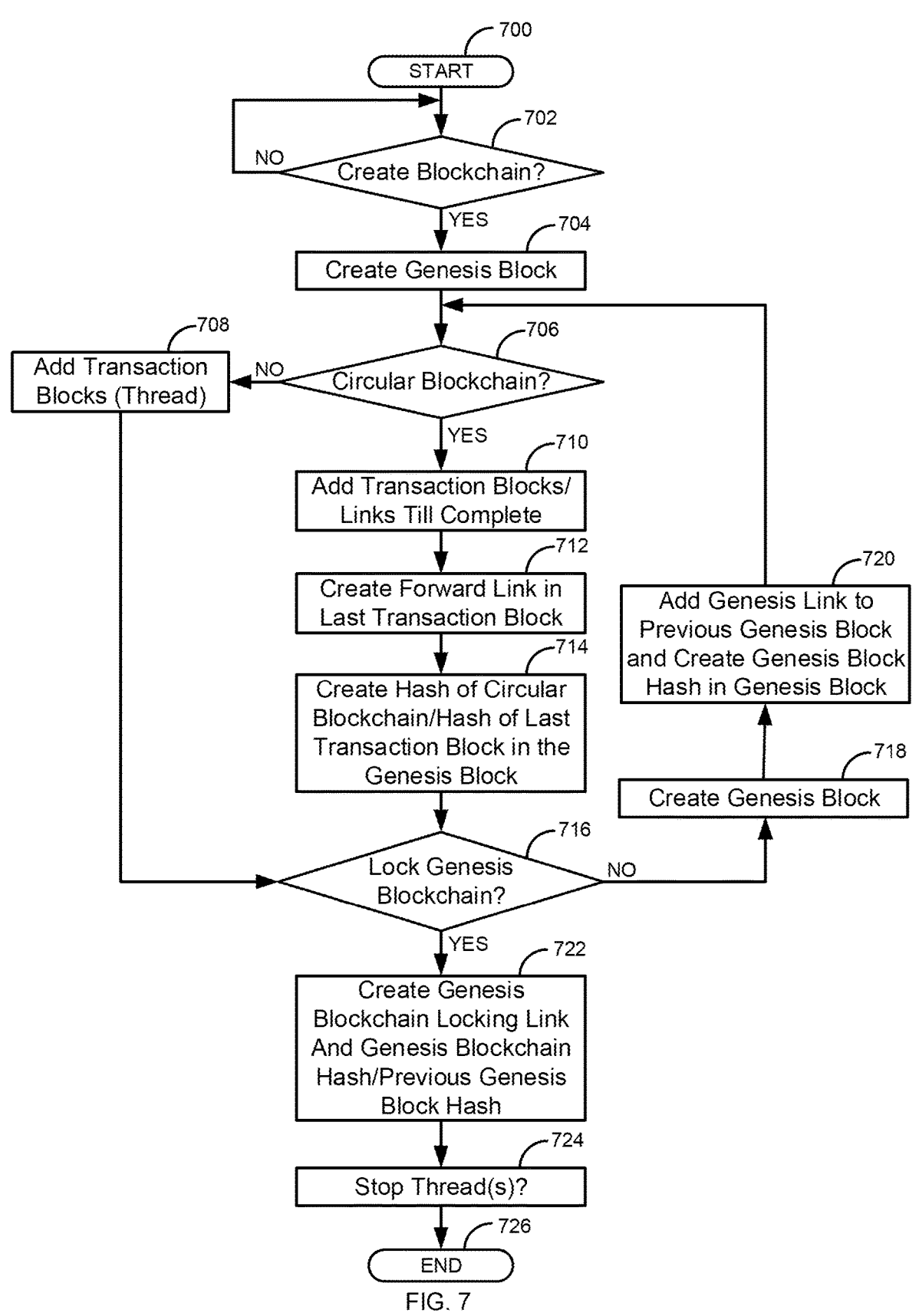
FIG. 7 is a flow diagram of a process for creating a plurality of circular blockchains that use genesis blocks that are part of a genesis blockchain.
Figure 8:
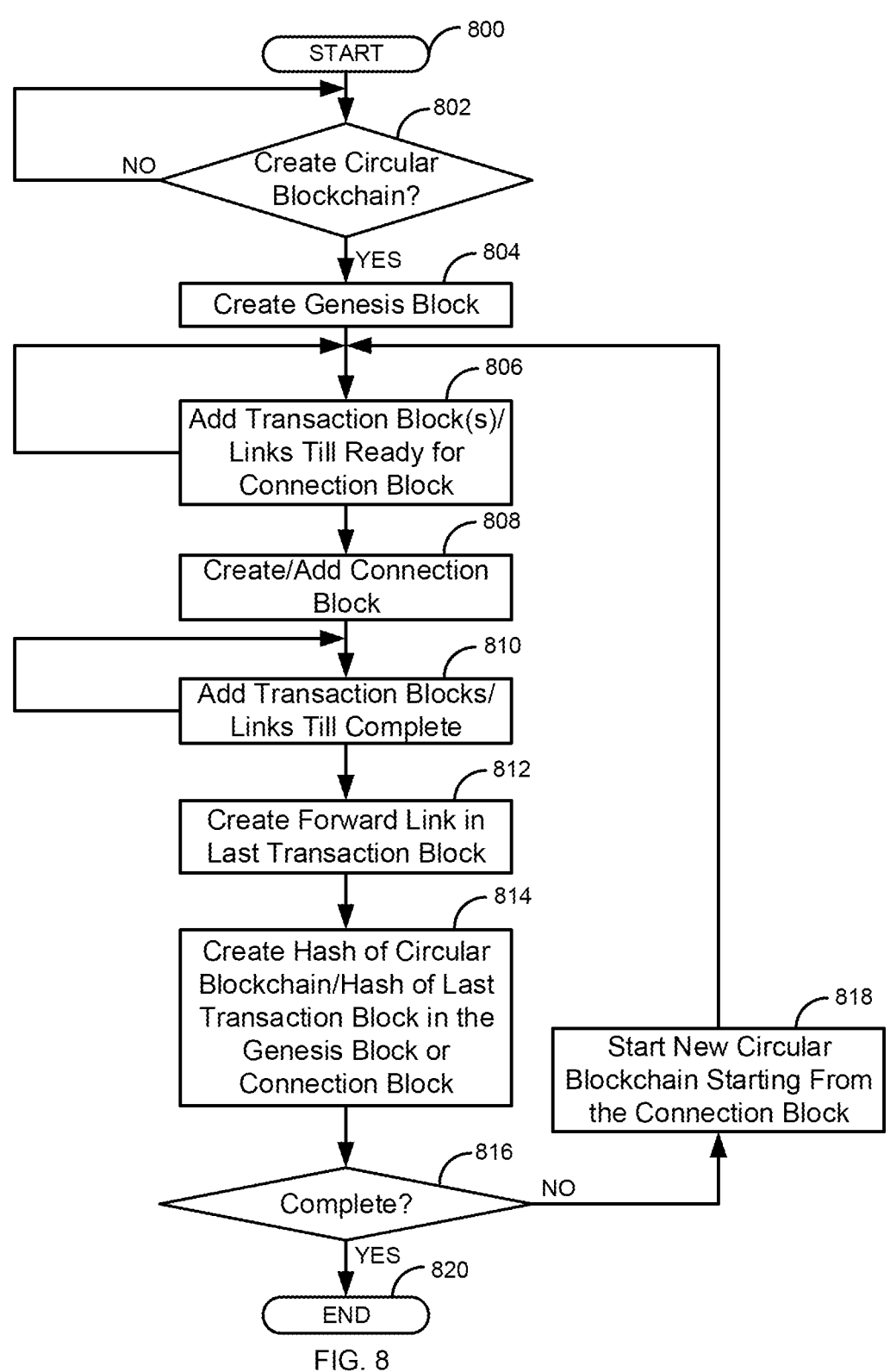
FIG. 8 is a flow diagram of a process for creating a plurality of circular blockchains that use connection blocks to form the plurality of circular blockchains.

FIG. 6 is a flow diagram of a process for creating a plurality of circular blockchains 123 that use a single genesis block 200. Illustratively, the communication devices 101, the distributed ledger 120, the nodes 121A-121N, the blockchain managers 122A-122N, the circular blockchains 123, and the non-circular blockchains 124 are stored-program-controlled entities, such as a computer or microprocessor, which performs the method of FIGS. 6-8 and the processes described herein by executing program instructions stored in a computer readable storage medium, such as a memory (i.e., a computer memory, a hard disk, and/or the like). Although the methods described in FIGS. 6-8 are shown in a specific order, one of skill in the art would recognize that the steps in FIGS. 6-8 may be implemented in different orders and/or be implemented in a multi-threaded environment. Moreover, various steps may be omitted or added based on implementation.

The process starts in step 600. The blockchain manager 122 determines, in step 602, if a request to create a circular blockchain 123 has been received. If a request to create a circular blockchain 123 has not been received in step 602, the process of step 602 repeats. Otherwise, if a request to create a circular blockchain 123 has been received in step 602, the blockchain manager 122 creates, in step 604, a single genesis block 200. The blockchain manager 122 adds transaction block(s) 201/forward links 202 till complete in step 606. For example, as shown in FIG. 2, the transaction blocks 201AA-201AN/links 202AA-202AN are added in step 606.

A forward link 203 is added to the last transaction block 201 (e.g., forward link 203A/transaction block 201AN), in step 608, that points back to the single genesis block 200. The forward link 203 locks the circular blockchain (e.g., circular blockchain 123A). A hash of the circular blockchain 123 (e.g., AHash 204A) and/or a hash of the last transaction block (e.g., ANHash 205A) is created, in step 610, and stored in the single genesis block 200. A genesis block link 206 (e.g., genesis block link 206A) that points to the forward link 202 in the next circular blockchain 123 (e.g., genesis block link 206A that points to the forward link 202BA) is created in step 612.

The blockchain manager 122 determines, in step 614, if the single genesis block 200 is to be locked. If the single genesis block 200 is not ready to be locked in step 616, the blockchain manager 122 starts the next circular blockchain (e.g., circular blockchain 123B) in step 616. The blockchain manager 122 starts to add transaction blocks 201 to the next circular blockchain 123 (e.g., circular blockchain 123B) in step 606 and the process repeats.

Otherwise, if the single genesis block 200 is to be locked in step 614, the blockchain manager 122 creates the genesis block locking link 207 in step 618. The genesis block locking link 207 lock the whole blockchain 210. The process then ends in step 620.

FIG. 7 is a flow diagram of a process for creating a plurality of circular blockchains 123 that use genesis blocks 300A-300N that are part of a genesis blockchain 323. FIG. 7 is a process that works with the embodiments described in FIGS. 3-4. The process starts in step 700. The blockchain manager 122 waits to receive a request to create a circular blockchain 123 in step 702 (or may be a request to create a non-circular blockchain 124). If a request to create a circular blockchain 123/non-circular blockchain 124 has not been received in step 702, the process of step 702 repeats.

Otherwise, if a request to create a circular blockchain 123/non-circular blockchain 123 is received in step 702, the blockchain manager 122 creates the genesis block 300A in step 704.

The blockchain manager 122 determines, in step 706, if the blockchain is a circular blockchain 123 or a non-circular blockchain 124. If the blockchain is a circular blockchain in step 706, the blockchain manager 122 adds transactions blocks 201 (e.g., transaction blocks 201AA-201AN/links 202AA-202AN) till complete in step 710. The blockchain manager 122 creates, in step 712, the forward link 303A in the transaction block 201AN that links to the genesis block 300A. The blockchain manager 122 creates a hash of the circular blockchain 123A (AHash 204A)/hash of the last transaction block 205A (ANHash 205A) in step 714.

The blockchain manager 122 determines, in step 716, if the genesis blockchain 323 is to be locked. If the genesis blockchain 323 is not to be locked in step 712, the blockchain manager 122 creates the next genesis block 300B in step 718. The blockchain manager 122 adds the genesis link 306A to the genesis block 300A and creates the genesis block hash (e.g., GAHash 305A) in the genesis block 300B. The process then goes back to step 706.

If the blockchain is a non-circular blockchain 124 in step 706, the blockchain manager 122 adds the transaction blocks (e.g., transaction blocks 201BA-201BN+1) to the non-circular blockchain 124. Since the non-circular blockchain 124 does not lock, a thread is created to add new blocks (i.e., the transaction blocks 201 in the non-circular blockchain 124 may be added in parallel to transaction blocks 201 in the active circular blockchain 123. The process then goes to step 716.

If the genesis blockchain 323 is to be locked in step 716, the blockchain manager 122 creates the genesis blockchain locking link 307 and genesis blockchain hash (GHash 304A)/Previous Genesis block hash (GNHash 305N) in step 722. The blockchain manager 122 may optionally stop the thread(s) of step 708 for the non-circular blockchains 124 in step 724. The process then ends in step 726. At this point, the genesis blockchain 323 is locked as well as each of the circular blockchain 123A-123N. The non-circular blockchains 124 may also be essentially locked if the thread(s) are stopped in step 724.

FIG. 8 is a flow diagram of a process for creating a plurality of circular blockchains 123 that use connection blocks 501 to form the plurality of circular blockchains 123. The process of FIG. 6 is based on the exemplary embodiment of FIG. 5. The process starts in step 800. The blockchain manager 122 determines, in step 802, if a request to create a circular blockchain 123 is received. If a request to create a circular blockchain 123 is not received in step 802, the process of step 802 repeats.

Otherwise, if a request to create a circular blockchain 123 is received in step 802, the genesis block 500 is created in step 804. The blockchain manager 122 adds transaction block(s) 201/link(s) 202 (e.g., transaction block 201AA/link 202AA) till the circular blockchain 123A is ready for a connection block 501 in step 806. A connection block 501 may be added based on an event, such as, a defined number, a data size (e.g., data size of transactions), a specific event, and/or the like. The blockchain manager 122 creates and adds the connection block 501A in step 808. The blockchain manager 122 adds transaction block(s) 201/link(s) 202 (e.g., transaction block 201AN/link 202AN) till complete in step 810.

The blockchain manager 122 creates the forward link 303A back to the genesis block 500 (or the connection block 501A after the circular blockchain 123A is locked) in step 812. This locks the circular blockchain 123A. A hash of the circular blockchain/hash of the last transaction block (e.g., similar to Ahash 204A/ANhash 205A) is created, in step 814, in the genesis block 500 (or the connection block 501A after the circular blockchain 123A is locked).

The blockchain manager 122 determines, in step 816, if the process is complete. If the process is not complete in step 816, the blockchain manager 122 starts a new circular blockchain 123B starting from the connection block 501A in step 818. The process then goes back to step 806 and repeats the circular blockchain 123 creation process. Otherwise, if the process is complete in step 816, the process ends in step 820.

The various examples of circular blockchains 123 described herein are more efficient than traditional non-circular blockchains 124 that are continually building. By linking back to a genesis block 200, 300, 500 or a connection block 501, the blockchain structure is more efficient because the whole blockchain 210 is divided into separate circular blockchains 123. In addition, because the circular blockchain 123 links back on to itself, it is more secure than traditional blockchains because of the circular linking structure.

Examples of the processors as described herein may include, but are not limited to, at least one of Qualcomm® Snapdragon® 800 and 801, Qualcomm® Snapdragon®610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that, when executed by the microprocessor, cause the microprocessor to:
create, using a hashing algorithm, a plurality of circular blockchains, each circular blockchain including a sequence of transaction blocks;
generate one of:
a single genesis block that indicates one or more types of transaction blocks included in each of the plurality of circular blockchains, wherein a last block of each circular blockchain links back to the single genesis block;
a plurality of genesis blocks, each genesis block corresponding to one of the plurality of circular blockchains and specifying one or more types of transaction blocks included in that corresponding circular blockchain, wherein the last block of each circular blockchain links back to its corresponding genesis block; and
a genesis block that indicates the one or more types of transaction blocks in each of the plurality of circular blockchains and one or more connection blocks that interconnect the plurality of circular blockchains;
store, in each genesis block, a hash of an associated blockchain and a hash of a last transaction block of that circular blockchain;
store, in the single genesis block or in each of the plurality of genesis blocks, additional information associated with a locked one of the plurality of circular blockchains, the additional information comprising at least one of:
date and time information indicating when the one of the plurality of circular blockchains was locked;
information identifying one or more specific transaction blocks in the locked circular blockchain;
information specifying types of transaction blocks in the locked circular blockchain;
an index value identifying the locked circular blockchain; and a number or type of transaction blocks in an overall blockchain structure that includes the plurality of circular blockchains; and
perform a search operation that uses the stored additional information in the single genesis block or in the plurality of genesis blocks to identify a specific transaction block within the overall blockchain structure without sequentially searching all of the transaction blocks in the overall blockchain structure.

2. The system of claim 1, wherein the plurality of circular blockchains comprise the single genesis block.

3. The system of claim 2, wherein the single genesis block comprises a plurality of genesis block links that link the plurality of circular blockchains together.

4. The system of claim 3, wherein the single genesis block comprises a genesis block locking link that links back to a first blockchain of the plurality of circular blockchains from a last blockchain of the plurality of circular blockchains and wherein the genesis block locking link locks the overall blockchain structure.

5. The system of claim 2, wherein the single genesis block comprises one or more of: a hash of each circular blockchain, a hash of a last transaction block of each circular blockchain, and a digital signature.

6. The system of claim 1, wherein the plurality of circular blockchains comprise the plurality of genesis blocks.

7. The system of claim 6, wherein each genesis block comprises a digital signature.

8. The system of claim 6, wherein the plurality of circular blockchains comprises at least one of: a locked circular blockchain and an active circular blockchain, and a non-circular blockchain and a circular blockchain.

9. The system of claim 6, wherein the plurality of genesis blocks are linked together to form a genesis blockchain.

10. The system of claim 9, wherein the plurality of genesis blocks are locked with a genesis blockchain locking link.

11. The system of claim 1, wherein the plurality of circular blockchains comprise the genesis block and the one or more connection blocks.

12. The system of claim 11, wherein the genesis block and the one or more connection blocks comprises a digital signature.

13. The system of claim 11, wherein a last one of the plurality of circular blockchains does not have a connection block linking a next circular blockchain.

14. A method, comprising:
creating, by a microprocessor, using a hashing algorithm, a plurality of circular blockchains, each circular blockchain including a sequence of transaction blocks;
generating, by the microprocessor, one of:
a single genesis block that indicates one or more types of transaction blocks included in each of the plurality of circular blockchains, wherein a last block of each circular blockchain links back to the single genesis block;
a plurality of genesis blocks, each genesis block corresponding to one of the plurality of circular blockchains and specifying one or more types of transaction blocks included in that corresponding circular blockchain, wherein the last block of each circular blockchain link back to its corresponding genesis block; and
a genesis block that indicates the one or more types of transaction blocks in each of the plurality of circular blockchains and one or more connection blocks that interconnect the plurality of circular blockchains;

storing, by the microprocessor, in each genesis block, a hash of an associated blockchain and a hash of a last transaction block of that circular blockchain;

storing, by the microprocessor, in the single genesis block or in each of the plurality of genesis blocks, additional information associated with a locked one of the plurality of circular blockchains, the additional information comprising at least one of:

date and time information indicating when the one of the plurality of circular blockchains was locked;

information identifying one or more specific transaction blocks in the locked circular blockchain;

information specifying types of transaction blocks in the locked circular blockchain;

an index value identifying the locked circular blockchain; and a number or type of transaction blocks in an overall blockchain structure that includes the plurality of circular blockchains; and performing, by the microprocessor, a search operation that uses the stored additional information in the single genesis block or in the plurality of genesis blocks to identify a specific transaction block within the overall blockchain structure without sequentially searching all of the transaction blocks in the overall blockchain structure.

15. The method of claim 14, wherein the plurality of circular blockchains comprise the single genesis block.

16. The method of claim 15, wherein the single genesis block comprises a plurality of genesis block links that link the plurality of circular blockchains together.

17. The method of claim 14, wherein the plurality of circular blockchains comprise the plurality of genesis blocks.

18. The method of claim 17, wherein the plurality of genesis blocks are linked together to form a genesis blockchain.

19. The method of claim 14, wherein the plurality of circular blockchains comprise the genesis block and the one or more connection blocks.

20. A system comprising:

a microprocessor; and a computer readable medium, coupled with the microprocessor and comprising microprocessor readable and executable instructions that, when executed by the microprocessor, cause the microprocessor to:

create, using a hashing algorithm, a plurality of non-circular blockchains, each non-circular blockchains including a sequence of transactions blocks, wherein the plurality of non-circular blockchains each comprise an individual genesis block that indicates one or more types of transaction blocks in an associated non-circular blockchain, wherein the individual genesis block for each of the plurality of non-circular blockchains are linked together to form a genesis blockchain, and wherein each genesis block includes a hash of an associated blockchain and a hash of a last transaction block of the associated blockchain;

create, using a hashing algorithm, a plurality of circular blockchains, each circular blockchain including a sequence of transaction blocks;

generate one of:

a single genesis block that indicates one or more types of transaction blocks included in each of the plurality of circular blockchains, wherein a last block of each circular blockchain links back to the single genesis block;

a plurality of genesis blocks, each genesis block corresponding to one of the plurality of circular blockchains and specifying one or more types of transaction blocks included in that corresponding circular blockchain, wherein the last block of each circular blockchain links back to its corresponding genesis block; and a genesis block that indicates the one or more types of transaction blocks in each of the plurality of circular blockchains and one or more connection blocks that interconnect the plurality of circular blockchains;

store, in each genesis block, a hash of an associated blockchain and a hash of a last transaction block of that circular blockchain;

store, in the single genesis block or in each of the plurality of genesis blocks, additional information associated with a locked one of the plurality of circular blockchains, the additional information comprising at least one of:

date and time information indicating when the one of the plurality of circular blockchains was locked;

information identifying one or more specific transaction blocks in the locked circular blockchain;

information specifying types of transaction blocks in the locked circular blockchain;

an index value identifying the locked circular blockchain; and a number or type of transaction blocks in an overall blockchain structure that includes the plurality of circular blockchains; and perform a search operation that uses the stored additional information in the single genesis block or in the plurality of genesis blocks to identify a specific transaction block within the overall blockchain structure without sequentially searching all of the transaction blocks in the overall blockchain structure.

* * * * *